US012567950B2

(12) United States Patent
Madhavapeddi et al.

(10) Patent No.: US 12,567,950 B2
(45) Date of Patent: Mar. 3, 2026

(54) CRYPTOGRAPHICALLY SECURE AND PRIVACY-PRESERVING MATCHING

(71) Applicant: Google LLC, Mountain View, CA (US)

(72) Inventors: Shreedhar Madhavapeddi, Seattle, WA (US); Marcel M. Moti Yung, New York, NY (US); Bashar Kachachi, Clyde Hill, WA (US); Stephen W. Rupp, Brooklyn, NY (US); Samuel Benjamin Temes, Pelham, NY (US); Shreya Mathur, Carnation, WA (US)

(73) Assignee: Google LLC, Mountain View, CA (US)

( * ) Notice: Subject to any disclaimer, the term of this patent is extended or adjusted under 35 U.S.C. 154(b) by 249 days.

(21) Appl. No.: 18/283,387

(22) PCT Filed: Nov. 16, 2022

(86) PCT No.: PCT/US2022/050055
§ 371 (c)(1),
(2) Date: Sep. 21, 2023

(87) PCT Pub. No.: WO2023/211496
PCT Pub. Date: Nov. 2, 2023

(65) Prior Publication Data
US 2025/0038956 A1      Jan. 30, 2025

(30) Foreign Application Priority Data

Apr. 27, 2022      (IL) .......................................... 292554

(51) Int. Cl.
*G06F 21/00*          (2013.01)
*H04L 9/08*           (2006.01)
*H04L 29/06*          (2006.01)

(52) U.S. Cl.
CPC ............ *H04L 9/0819* (2013.01); *H04L 9/085* (2013.01)

(58) Field of Classification Search
CPC ... H04L 9/0819; H04L 9/085; H04L 2209/46; H04W 12/02; G06F 21/6245
See application file for complete search history.

(56) References Cited

U.S. PATENT DOCUMENTS

| | | | | |
|---|---|---|---|---|
| 11,151,660 B1 * | 10/2021 | Harding | ................. | G06Q 40/08 |
| 2015/0149763 A1 * | 5/2015 | Kamara | .................. | H04W 4/02 |
| | | | | 713/150 |

(Continued)

OTHER PUBLICATIONS

Office Action in Israel Appln. No. 292554, mailed on Jun. 4, 2024, 3 pages.

(Continued)

*Primary Examiner* — Lisa C Lewis
(74) *Attorney, Agent, or Firm* — Fish & Richardson P.C.

(57) ABSTRACT

This disclosure relates to protecting the security and privacy of data, including user identifiers (IDs). In some aspects, a method includes receiving, by a cryptographically-secure private set intersection (CSPSI) server and from a first device corresponding to a first entity, a first identifier retrieval request corresponding to a digital component request being sent from the first device to a second device corresponding to a second entity. The first identifier retrieval request includes a first encrypted user identifier generated by encrypting a user identifier for a user using a first encryption key corresponding to the first entity. The CSPSI server determines, using the encrypted user identifier, a bilateral encrypted user identifier for the user generated by encrypting the first encrypted user identifier using a second encryption key corresponding to the second entity. The CSPSI server sends the bilateral encrypted user identifier for the user to the first device.

18 Claims, 7 Drawing Sheets

(56)                    References Cited

U.S. PATENT DOCUMENTS

| 2017/0317994 A1* | 11/2017 | Salek | H04L 63/06 |
| 2018/0218168 A1* | 8/2018 | Goel | G06F 21/6245 |
| 2022/0239464 A1* | 7/2022 | Wang | G06F 21/608 |

OTHER PUBLICATIONS

International Preliminary Report on Patentability in International Appln. No. PCT/US2022/050055, mailed on Nov. 7, 2024, 9 pages.
Blog.google [online], "An updated timeline for Privacy Sandbox milestones" Jun. 2021, retrieved on Mar. 23, 2023, retrieved from URL <https://blog.google/products/chrome/updated-timeline-privacy-sandbox-milestones/>, 3 pages.
Blog.google [online], "Charting a course towards a more privacy-first web" Mar. 2021, retrieved on Mar. 23, 2023, retrieved from URL <https://blog.google/products/ads-commerce/a-more-privacy-first-web/#:~:text=First-party-,relationships,-are%20vital>, 3 pages.
Blog.google [online], "New ways for publishers to activate first-party data" Nov. 2021, retrieved on Mar. 23, 2023, retrieved from URL <https://blog.google/products/admanager/new-ways-publishers-activate-first-party-data/>, 4 pages.
International Search Report and Written Opinion in International Appln. No. PCT/US2022/050055, mailed on Apr. 3, 2023, 14 pages.
Privacysandbox.com [online], "The Privacy Sandbox" Mar. 2021, retrieved on Mar. 23, 2023, retrieved from URL <https://privacysandbox.com/>, 7 pages.
Security.googleblog.com [online], "Helping organizations do more without collecting more data" Jun. 2019, retrieved on Mar. 23, 2023, retrieved from URL <https://security.googleblog.com/2019/06/helping-organizations-do-more-without-collecting-more-data.html>, 6 pages.
Wikipedia.org [online], "HMAC" Feb. 2002, retrieved on Mar. 23, 2023, retrieved from URL <https://en.wikipedia.org/wiki/HMAC>, 7 pages.

* cited by examiner

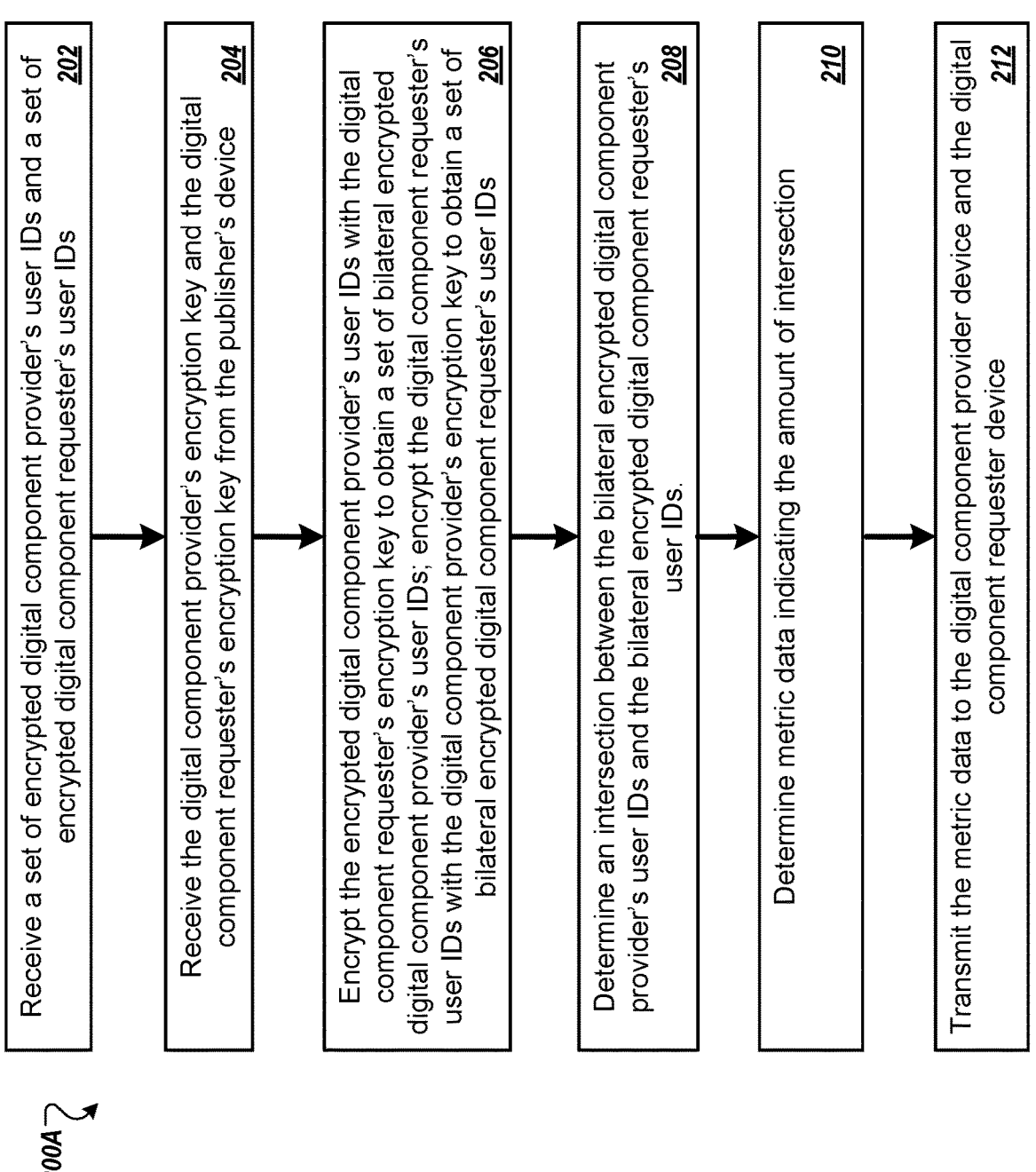

200A

Receive a set of encrypted digital component provider's user IDs and a set of encrypted digital component requester's user IDs    202

Receive the digital component provider's encryption key and the digital component requester's encryption key from the publisher's device    204

Encrypt the encrypted digital component provider's user IDs with the digital component requester's encryption key to obtain a set of bilateral encrypted digital component provider's user IDs; encrypt the digital component requester's user IDs with the digital component provider's encryption key to obtain a set of bilateral encrypted digital component requester's user IDs    206

Determine an intersection between the bilateral encrypted digital component provider's user IDs and the bilateral encrypted digital component requester's user IDs.    208

Determine metric data indicating the amount of intersection    210

Transmit the metric data to the digital component provider device and the digital component requester device    212

FIG. 2A

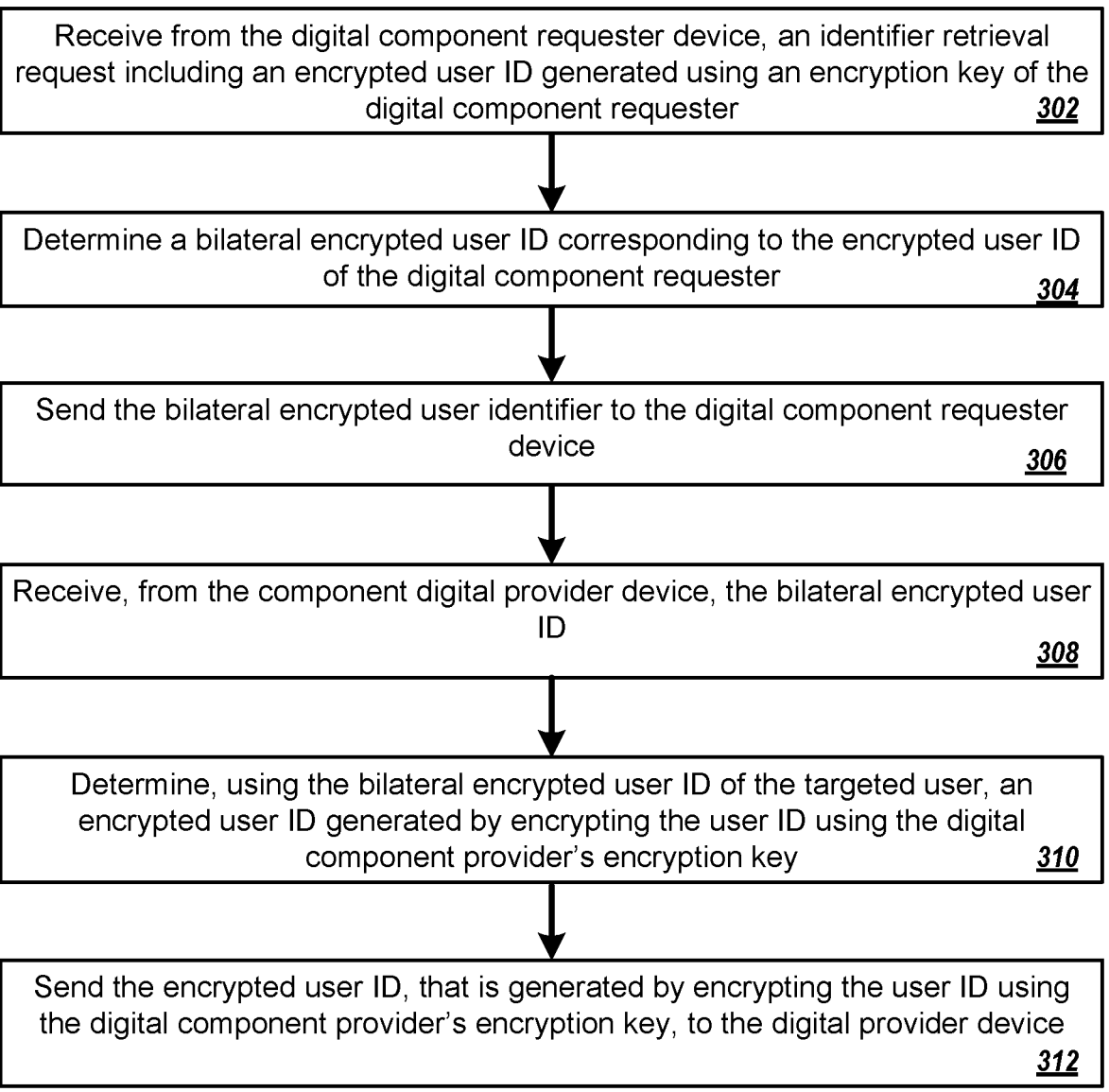

300A

Receive from the digital component requester device, an identifier retrieval request including an encrypted user ID generated using an encryption key of the digital component requester     _302_

Determine a bilateral encrypted user ID corresponding to the encrypted user ID of the digital component requester     _304_

Send the bilateral encrypted user identifier to the digital component requester device     _306_

Receive, from the component digital provider device, the bilateral encrypted user ID     _308_

Determine, using the bilateral encrypted user ID of the targeted user, an encrypted user ID generated by encrypting the user ID using the digital component provider's encryption key     _310_

Send the encrypted user ID, that is generated by encrypting the user ID using the digital component provider's encryption key, to the digital provider device     _312_

FIG. 3A

CRYPTOGRAPHICALLY SECURE AND PRIVACY-PRESERVING MATCHING

CROSS-REFERENCE TO RELATED APPLICATION

This application is a National Stage Application under 35 U.S.C. § 371 and claims the benefit of International Application No. PCT/US2022/050055, filed Nov. 16, 2022, which claims priority to Israel Application No. 292554, filed Apr. 27, 2022. The foregoing applications are incorporated herein by reference in their entirety for all purposes.

TECHNICAL FIELD

This specification is related to cryptography and data security.

BACKGROUND

Permutable encryption is a cryptographic technique that uses two permutative keys to convert a plaintext into the same cipher text regardless of the sequence or the order in which the two permutative keys are applied to the plaintext.

SUMMARY

This specification describes cryptographic technologies related to protecting the security and privacy of data.

Information technology and networks, such as the Internet, have made it easier to collect personal identifiable information (PII). People are having growing concerns about data security, their privacy, and how their personal data are being used. It is critical to protect user privacy and limit the distribution and accessibility of PII, while still providing customized services for improved user experience.

In a privacy-first world, organizations need to protect the private PII of users, such as the user identifiers (IDs). In the meantime, some organizations may want to work with other entities to provide customized services to the users. For example, an organization can act as a digital component provider, and provide digital components for display at client devices of users. These digital components can be customized for the users using first party data related to the users maintained by the digital component provider. It is important for any entity that stores user data to protect the privacy of the users and protect the security of the stored data such that other entities cannot access the users' data.

The techniques described in this document can enable the use of first-party user data of digital component providers in ways that prevent other entities from having access to the user data, and hence increasing data security. Furthermore, the techniques described in this document are performed without the use of browser cookies.

For example, a server can receive a digital component request that includes an encrypted user ID for a user of an electronic resource of a digital component requester. The digital component requester can be a publisher of an electronic resource, e.g., of a web site or native application, that requests digital components for display with content of the electronic resource. This encrypted user identifier can be an encrypted version of a user ID that is used by the digital component requester to identify the user. The server can use permutable encryption techniques to perform cryptographically secure and privacy-preserving matching to identify an encrypted user ID of the same user that is used by the digital component provider to identify the user. Both the digital component requester and the digital component provider can use the same user ID to identify a given user. The digital component provider can decrypt the encrypted user identifier to determine the plaintext user ID. As a result, the digital component provider has access to the user ID of the user for which a digital component is being selected and can provide a digital component customized to the user, e.g., having content that is beneficial and/or known or predicted to be of interest to the user. Because the user data exchanged among different entities is in encrypted forms, user data security is maintained and the privacy of the user data is protected.

In general, one innovative aspect of the subject matter described in this specification can be embodied in methods that include receiving, by a cryptographically-secure private set intersection server and from a first device corresponding to a first entity, a first identifier retrieval request (i) corresponding to a digital component request being sent from the first device to a second device corresponding to a second entity and (ii) including a first encrypted user identifier generated by encrypting a user identifier for a user using a first encryption key corresponding to the first entity. The cryptographically-secure private set intersection server determined, using the first encrypted user identifier, a bilateral encrypted user identifier for the user generated by encrypting the first encrypted user identifier using a second encryption key corresponding to the second entity. The cryptographically-secure private set intersection server sends the bilateral encrypted user identifier for the user to the first device corresponding to the first entity. Other implementations of this aspect include corresponding apparatus, systems, and computer programs, configured to perform the aspects of the methods, encoded on computer storage devices.

These and other implementations can each optionally include one or more of the following features. Some aspects include receiving, by the cryptographically-secure private set intersection server and from the second device corresponding to the second entity, the bilateral encrypted user identifier: determining, by the cryptographically-secure private set intersection server using the bilateral encrypted user identifier, a second encrypted user identifier for the user generated by encrypting the user identifier for the user using a second encryption key corresponding to the second entity; and sending, by the cryptographically-secure private set intersection server, the second encrypted user identifier to the second device corresponding to the second entity.

In some aspects, the second device provides the bilateral encrypted user identifier to the cryptographically-secure private set intersection server in response to receiving the digital component request comprising the bilateral encrypted user identifier from the first device and the second device provides, to the first device, selection criteria for a digital component selected based on the user identifier for the user after decrypting the second encrypted user identifier using a decryption key corresponding to the second entity.

In some aspects, the first device selects a particular digital component for display to the user based on respective selection criteria received from multiple entities and provides the selected digital component for display to the user.

In some aspects, the first encrypted user identifier is obtained by i) encrypting the user identifier for the user using a shared encryption key that is shared between the first entity and the second entity to obtain an initial cypher text of the user identifier, and ii) encrypting the initial cypher text of the user identifier using the first encryption key corresponding to the first entity, and the second encrypted user identifier is obtained by i) encrypting the user identifier for the user using the shared encryption key that is shared between the first entity and the second entity to obtain the initial cypher text of the user identifier, and ii) encrypting the initial cypher text of the user identifier using the second encryption key corresponding to the second entity.

In some aspects, the bilateral encrypted user identifier for the user is encrypted using a third encryption key corresponding to the cryptographically-secure private set intersection server. In some aspects, the first encryption key and the second encryption key are permutative keys.

Some aspects include receiving, by the cryptographically-secure private set intersection server, i) a first set of encrypted user identifiers from the first device corresponding to the first entity, the first set of encrypted user identifiers comprising a first set of user identifiers encrypted using the first encryption key corresponding to the first entity, and ii) a second set of encrypted user identifiers from the second device corresponding to the second entity, the second set of encrypted user identifiers comprising a second set of user identifiers encrypted using the second encryption key corresponding to the second entity: receiving, by the cryptographically-secure private set intersection server, the first encryption key from the first device and the second encryption key from the second device: encrypting, by the cryptographically-secure private set intersection server, i) the first set of encrypted user identifiers using the second encryption key to obtain a first set of bilateral encrypted user identifiers, ii) the second set of encrypted user identifiers using the first encryption key to obtain a second set of bilateral encrypted user identifiers: determining, by the cryptographically-secure private set intersection server, an intersection between the first set of bilateral encrypted user identifiers and the second set of bilateral encrypted user identifiers: determining, by the cryptographically-secure private set intersection server, metric data indicating an amount of the intersection; and transmitting, by the cryptographically-secure private set intersection server, the metric data to the first device and the second device.

In some aspects, the intersection can correspond to a set of matching user identifiers that are included the first set of user identifiers corresponding to the first entity and the second set of user identifiers corresponding to the second entity. The metric data can include a first percentage of the set of matching user identifiers in the first set of user identifiers corresponding to the first entity and a second percentage of the set of matching user identifiers in the second set of user identifiers associated with the second entity.

Some aspects include storing a first correspondence relationship between the first set of encrypted user identifiers and the first set of bilateral encrypted user identifiers and storing a second correspondence relationship between the second set of encrypted user identifiers and the second set of bilateral encrypted user identifiers.

In some aspects, the first set of encrypted user identifiers are obtained by encrypting the first set of user identifiers with a shared encryption key that is shared between the first entity and the second entity to obtain an initial cypher text of the first set of user identifiers, and encrypting the initial cypher text of the first set of user identifiers using the first encryption key corresponding to the first entity, and the second set of encrypted user identifiers are obtained by encrypting the second set of user identifiers with the shared encryption key that is shared between the first entity and the second entity to obtain an initial cypher text of the second set of user identifiers, and encrypting the initial cypher text of the second set of user identifiers using the second encryption key corresponding to the second entity.

Some aspects include encrypting, by the cryptographically-secure private set intersection server, the first set of bilateral encrypted user identifiers and the second set of bilateral encrypted user identifiers with a third encryption key corresponding to the cryptographically-secure private set intersection server.

The subject matter described in this specification can be implemented in particular embodiments so as to realize one or more of the following advantages. Cryptographically secure and privacy-preserving matching techniques described in this document enable first party user data to be used in a secure and privacy preserving way to provide customized content to users without leaking the user data to other entities. Historically, user data was often collected using third party cookies, which enabled cross-domain tracking of the user's online activities. The use of third party cookies is being blocked and/or deprecated by browsers, which limits the ability to obtain user data. The techniques described in this document enable the use of a limited amount of user data, e.g., first party data, without requiring the use of any third-party cookies and in ways that secure user data and protect user privacy, especially relative to techniques that employ third-party cookies.

A server can use permutative keys and/or other encryption techniques to perform the cryptographically secure and privacy-preserving matching between user IDs of the participating entities, e.g., the digital component requester and the digital component provider. The cryptographically secure and privacy-preserving matching can prevent confidential user data of different entities that participate in the process from being leaked to other entities. The techniques described in this document can include encrypting the confidential information multiple times using different entities keys to ensure that, even if a computer of one entity is compromised, the amount of confidential information that can be accessed is minimized or at least reduced relative to other techniques.

In the process of providing the customized digital components, any user data that is exchanged among the participating entities and the server is encrypted to prevent any other entity, including the server that performs the matching from identifying the user for which digital components are being requested. In some implementations, the participating entities may use intermediary platforms, such as demand-side platform (DSP) and supply-side platform (SSP) to enable customized user services. The intermediary platforms may only receive user IDs that are encrypted, thereby preventing these platforms from being able to identify the users for which digital components are being requested.

By preventing the server and other entities from identifying the users using these encryption techniques can prevent these entities from tracking users across multiple requests, e.g., to build a user profile for the users. For example, the digital component requesters can include many different publishers that publish content related to many different topics. If an entity, such as the server, can access a user's ID across multiple requests, the entity can build a profile of the user's interests across multiple domains. The entity would also have access to the digital components provided to the users, providing access to additional user data. The encryption techniques described in this document enable such protections, while also enabling secure user ID matching such that digital component providers can use confidential user data to customize content for the users.

The cryptographically secure and privacy-preserving matching is performed within a specific relationship between two entities. For example, the encrypted ID data are useful only in the context of the specific relationship, and would be meaningless outside that specific relationship. As a result, the cryptographically secure and privacy-preserving matching can prevent cross-domain tracking by other entities.

The techniques described in this document can prevent individual tracking while still delivering customized user services. Such techniques allow users to access a broad range of customized user services with confidence that their privacy and choices are respected.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A is a flow diagram of an example process for encrypting user IDs and determining metric data indicating intersection amounts.

FIG. 3A is a flow diagram of an example process for providing customized digital components.

Like reference numbers and designations in the various drawings indicate like elements.

DETAILED DESCRIPTION

Figure 1:
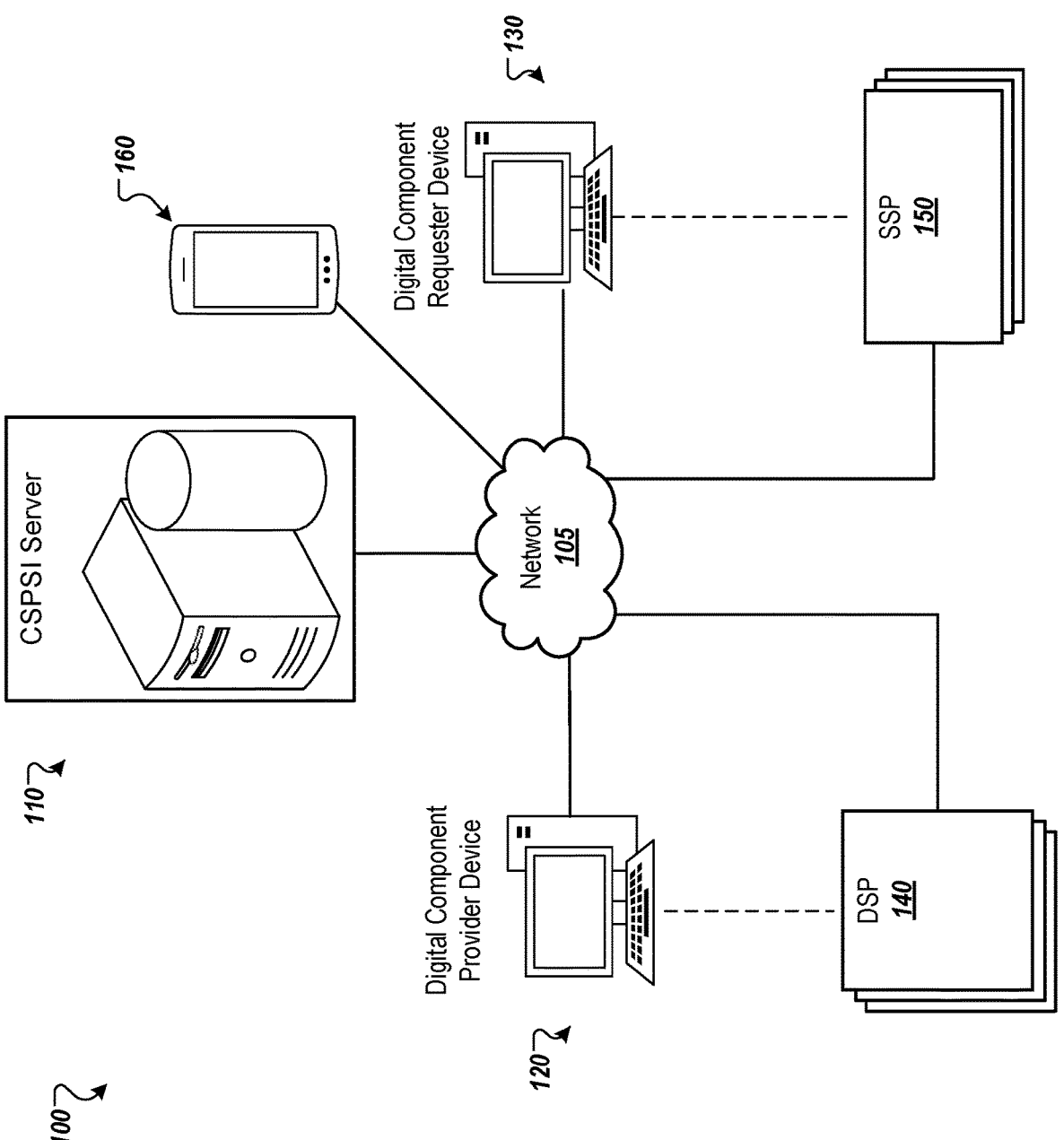
FIG. 1 is a block diagram of an example environment in which a cryptographically-secure private set intersection (CSPSI) sever performs cryptographically secure and privacy-preserving matching of user IDs.

In general, this document describes systems and techniques that employ bilateral encryption, e.g., using permutative keys, communicative keys, and/or other types of encryption, to prevent the leakage of confidential user data, e.g., user IDs maintained by different entities, while still enabling customized services that would typically involve the use of non-secure third party cookies. In the permutable encryption approach, two permutative keys convert a plaintext into the same cipher text regardless of the sequence/order in which the two permutative keys are applied. Bilateral encryption can involve encrypting data, e.g., a user identifier using respective encryption keys of two parties. When used for user identifiers, the bilateral encryption results in a bilateral encrypted user identifier for use by the two parties. Although the description that follows is largely in terms of commutative (permutable) encryption, other cryptographic protocols and/or techniques can be used to generate bilateral encrypted identifiers.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files. Digital components can take the form of video files, audio files, multimedia files, image files, or text files and include advertising information, such that an advertisement is a type of digital component. For example, the digital component may be content that is intended to supplement content of a web page, application content (e.g., an application page), or other resource displayed by applications of the digital component requester. More specifically, the digital component may include digital content that is relevant to the resource content, e.g., the digital component may relate to the same topic as the web page content, or to a related topic. The provision of digital components can thus supplement, and generally enhance, the web page or application content.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an example environment in which a cryptographically-secure private set intersection (CSPSI) sever 110 performs cryptographically secure and privacy-preserving matching of user IDs. The example environment 100 includes the CSPSI sever 110, a digital component provider device 120, a digital component requester device 130, and a client device 160 that are connected over a data communication network 105. Furthermore, the digital component provider device 120 corresponds to or includes a demand-side platform (DSP) 140; the digital component requester device 130 corresponds to or includes a supply-side platform (SSP) 150. The demand-side platform 140 and the supply-side platform 150 can communicate with each other and communicate with the CSPSI server 110 over the network 105. The example environment 100 may include many different digital component provider devices 120, digital component requester devices 130, DSPs 140, SSPs 150, and client devices 160.

The CSPSI server 110 can be implemented as one or more servers that are configured to perform the techniques for matching of user IDs described in this document. The CSPSI server 110 can determine the intersection between two user sets maintained by two entities, without accessing the confidential information of the users corresponding to the two user sets. For example, one entity can be a digital component provider and the other entity can be a digital component requester. The digital component provider and the digital component requester can work with each other. For example, the digital component provider may desire to publish or display customized digital components on the digital component requester's electronic resources, e.g., applications (e.g., native applications), websites, digital newspapers, multi-media channels, etc. The digital component provider-requester relationship is used as an example, the techniques described in this document can be applied to other entities or relationships.

The digital component provider device 120 can be any electronic device that is capable of communicating over the network 105. In some implementations, the digital component provider device 120 corresponds to an organization, e.g., that provides products, services, or information to users. The digital component provider device 120 can maintain user data for a set of users that have a first-party relationship with the digital component provider. For example, the digital component provider device 120 can maintain user data for users that previously registered with (e.g., subscribed to), an electronic resource of the digital component provider or that visited an electronic resource of the digital component provider. This can establish direct connections between the digital component provider and its users. For instance, the digital component provider's users can register with the digital component provider to receive products or services provided by the digital component provider.

The digital component provider device 120 can maintain, for each of these users, a user ID that identifies the user to the digital component provider along with additional information about the user. This additional information can include information provided to the digital component provider by the user, e.g., profile information, information about the user's interactions with the digital component provider's electronic resources (e.g., items viewed, selected, or acquired), and/or other appropriate information. As described in more detail below, this information can be used to select and/or customize a digital component to provide to the user in response to a digital component request that includes the user's identifier, which will be received by the digital component provider device 120 in encrypted form.

The digital component requester device 130 can be any electronic device that is capable of communicating over the network 105. In some implementations, a digital component requester can be a company or any other organization that provide content distribution services to its own users, such as a publisher. For example, a publisher can display content on web sites and/or in native applications. Example publishers include news sites and/or applications, video streaming sites and/or applications, blogs, and electronic games and/or applications, to name just a few examples. The digital component requester's users can sign up to receive the content or any other information from the digital component requester. The digital component requester device 130 can maintain, for each of these users, a user ID that identifies the user to the digital component requester, e.g., along with additional information about the user such as information provided by the user.

Although only one digital component provider device 120 and one digital component requester device 130 are shown in FIG. 1, each digital component provider can have a relationship with multiple digital component requesters to select digital components for display at the digital component requester's electronic resources. Similarly, each digital component requester can have a relationship with multiple digital component providers from which to request digital components for display at the digital component requester's electronic resources. Each pair of digital component provider and digital component requester can have a set of users in common such that the digital component provider can use the user data for these users in selecting and/or customizing digital components for display to the users.

To enable customized user services for a digital component provider and a digital component requester, it is beneficial to determine the intersection between the digital component provider's users and the digital component requester's users, e.g., users that are common to both the digital component provider and the digital component requester. For example, the intersection can include users that have registered with both the digital component provider and the digital component requester. As described below, determining this intersection enables the digital component provider to select and/or customize digital components for users for which the digital component requester requests digital components. However, the user information, such as the user IDs of both the digital component provider's users and the digital component requester's users, is confidential and can be maintained securely by both the provider and requester.

To protect the confidentiality of the user IDs, the digital component provider device 120 can encrypt a set of digital component provider's user IDs with the digital component provider's encryption key. Similarly, the digital component requester device 130 can encrypt a set of digital component requester's user IDs with the digital component requester's encryption key. The digital component provider device 120 can transmit its set of encrypted digital component provider's user IDs to the CSPSI server 110 over the network 105. The digital component requester device 130 can transmit its set of encrypted digital component requester's user IDs to the CSPSI server 110.

To determine the intersection of the two sets of users without accessing the confidential information of the user IDs, the CSPSI server 110 can receive the set of encrypted digital component provider's user IDs and the set of encrypted digital component requester's user IDs. Because the received user IDs are encrypted, the privacy of the users is protected, e.g., by preventing the CSPI server 110 and other entities from accessing the user IDs in plaintext. Plaintext is text that is not computationally tagged, specially formatted, or written in code, or data, including binary files, in a form that can be viewed or used without requiring a key or other decryption device, or other decryption process. The CSPSI server 110 can perform privacy-preserving matching between user IDs in the two sets of encrypted user IDs.

In some implementations, the CSPI server 110 performs the matching using a permutable encryption approach. In this approach, two permutative keys convert a plaintext user ID into the same cipher text regardless of the sequence/order in which the two permutative keys are applied to the user ID. In this example, the digital component provider's encryption key used to generate the encrypted digital component provider's user IDs and the digital component requester's encryption key used to generate the encrypted digital component requester's user IDs are permutative encryption keys. In this way, encrypting the user ID of a user first using the digital component provider's encryption key and then encrypting this resulting encrypted user ID using the digital component requester's encryption key results in the same bilateral encrypted user ID (also referred to as bilateral user ID for brevity) as encrypting the user ID of the user first using the digital component requester's encryption key and then encrypting this resulting encrypted user ID using the digital component provider's encryption key.

The CSPSI server 110 can request the two permutative keys. For example, the CSPSI server 110 can request the digital component provider's encryption key from the digital component provider device 120 and request the digital component requester's encryption key from the digital component requester device 130. To prevent the CSPSI from obtaining any user ID in plaintext, the encryption keys may not be capable of being used to decrypt the encrypted user IDs. The CSPSI server 110 can perform bilateral encryption on the two sets of encrypted user IDs using the permutative keys to obtain bilateral user IDs.

The CSPSI server 110 can perform the bilateral encryption on the two sets of encrypted user IDs by encrypting the set of encrypted user IDs received from the digital component provider device 120 using the digital component requester's encryption key to generate a first set of bilateral user IDs. The CSPSI server 110 can also encrypt the set of encrypted user IDs received from the digital component requester's device 130 using the digital component provider's encryption key to generate a second set of bilateral user IDs. If the same user ID was included in both sets of user IDs, the both sets of bilateral user IDs will have a matching bilateral user ID for that user since permutative encryption was applied to the user IDs.

Figure 2B:
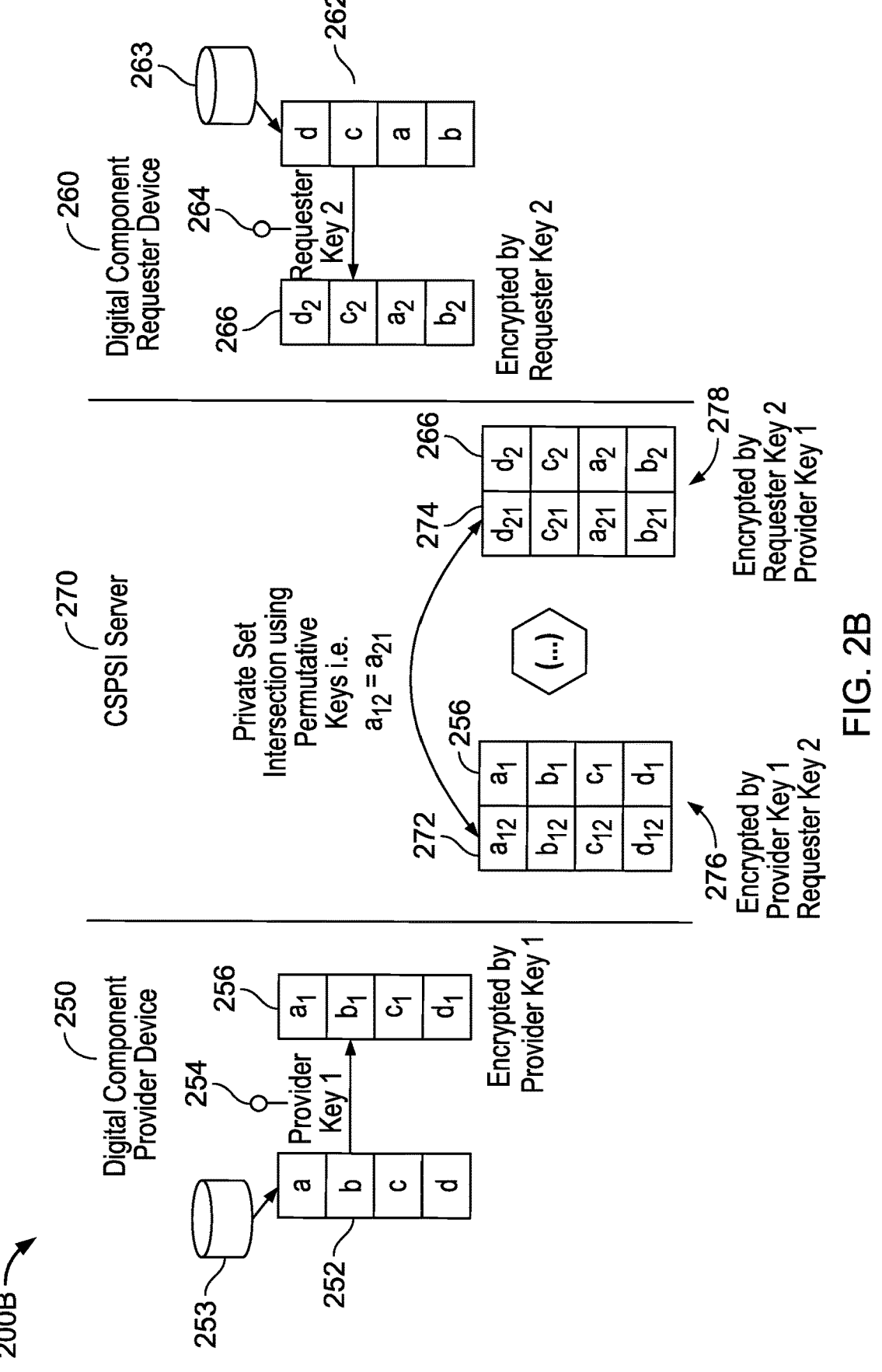
FIG. 2B shows a data flow of an example process for encrypting user IDs and determining metric data indicating intersection amounts.

The CSPSI server 110 can perform cryptographically secure and privacy-preserving matching based on the bilateral user IDs. This can include comparing the bilateral IDs of both sets of bilateral user IDs to identify matching bilateral user IDs. If both sets have the same bilateral user ID, there is a match and this matching bilateral user ID identifiers a user that is common to both the digital component provider and the digital component requester. The CSPSI server 110 can determine metric value including, for example, a matching ratio for the digital component provider and the digital component requester, and transmit the metric data to the digital component provider device 120 and the digital component requester device 130. The matching ratio for the digital component provider can be a ratio between (i) a quantity of bilateral user IDs in the first set of bilateral user IDs that match a corresponding bilateral user ID in the second set of bilateral user IDs and (ii) the total quantity of bilateral user IDs in the first set of bilateral user IDs. Similarly, the matching ratio for the digital component requester can be a ratio between (i) a quantity of bilateral user IDs in the second set of bilateral user IDs that match a corresponding bilateral user ID in the first set of bilateral user IDs and (ii) the total quantity of bilateral user IDs in the second set of bilateral user IDs. Example processes for cryptographically secure and privacy-preserving matching using the permutative keys are illustrated in FIGS. 2A and 2B.

The digital component provider device 120 and the digital component requester device 130 can determine whether to proceed with customized user services based on their respective matching ratios. For example, if the matching ratio satisfies a threshold, e.g., by meeting or exceeding the threshold, the digital component provider device 120 and/or the digital component requester device 130 can determine to proceed with the customized user services. If so, each device can notify the other device and/or notify the CSPSI server 110 that the bilateral keys should be used to facilitate the customized user services.

In some implementations, the digital component requester can use a SSP 150 to manage the process of obtaining digital components for digital component slots of the digital component requester's electronic resources. The digital component requester device 130 can communicate with the SSP 150 over the network 105. An SSP 150 is a technology platform implemented in hardware and/or software that automates the process of obtaining digital components for digital component requester's resources and/or applications. Each digital component requester can have a corresponding SSP 150 or multiple SSPs 150. Some digital component requesters may use the same SSP 150. The SSP 150 can interact with one or more DSPs 140 to perform customized user service, e.g. to request digital components for display with content of the electronic resources.

In some implementations, the digital component provider can create digital components that are to be presented in digital component slots of digital component requesters' electronic resources. The digital component provider can use a demand-side platform (DSP) 140 to manage the provisioning of its digital components for presentation in the digital component slots. The digital component provider device 120 can communicate with the DSP 140 over the network 105. A DSP 140 is a technology platform implemented in hardware and/or software that automates the process of distributing digital components for presentation with the resources and/or applications of the digital component requester. The DSP 140 can interact with one or more SSPs 150 to provide digital components for presentation with the resources and/or applications of multiple different digital component requesters. For instance, the DSP 140 can receive requests for digital components from the SSP 150, generate or select one or more digital components created by the digital component provider, and return the digital component (or information about the digital component) to the SSP 150. In some implementations, the DSP 140 can provide selection criteria for selecting a digital component, and provide the selection criteria to the SSP 150. The selection criteria can include an amount that the digital component provider is willing to provide for the digital component to be displayed with the electronic resource of the digital component requester.

To enable customized user services, the digital component requester device 130 can initiate a request for digital components for a particular user. The digital component requester device 130 can use an encrypted user ID of the particular user to request the customized digital component from the digital component provider device 120, e.g., by including the encrypted user ID in the digital component request. In some implementations, the provision and publishing of the digital components can be implemented using the intermediary platforms, such as DSP 140 and the SSP 150. The DSP 140 and the SSP 150 can communicate with each other. Further, the DSP 140 can communicate with the CSPSI server 110. The SSP 150 can communicate with the CSPSI server 110. In some implementations, only the encrypted user ID and/or the bilateral encrypted user ID are exchanged with the CSPSI server 110. As a result, the user's privacy is protected from the intermediary platforms, e.g., DSP and SSP, any other participating entities, and the CSPSI server 110.

The CSPSI server 110 can receive a request for a bilateral user ID corresponding to the particular user from the digital component requester device 130 or the SSP 150 for the digital component requester. For example, the SSP 150 can receive the digital component request from the digital component requester device 130 (or the client device 160). That is, either a client device 160 that is accessing an electronic resource of the digital component requester or the digital component requester's device 130 can generate a digital component request in response to the client device 160 accessing the electronic resource. The digital component request can be a request for one or more digital components to display with content of the electronic resource.

The digital component request can include the encrypted digital component requester's user ID for the user, which is the user ID encrypted using the digital component requester's encryption key as described above. The SSP 150 can generate and send an identifier retrieval request to the CSPSI server 110 to obtain the bilateral user ID for the particular user. This identifier retrieval request can include the encrypted digital component requester's user ID from the digital component request. The CSPSI server 110 can use the encrypted digital component requester's user ID of the particular user to identify the corresponding bilateral user ID for the user and provide the bilateral user ID for the user to the SSP 150.

Figure 3B:
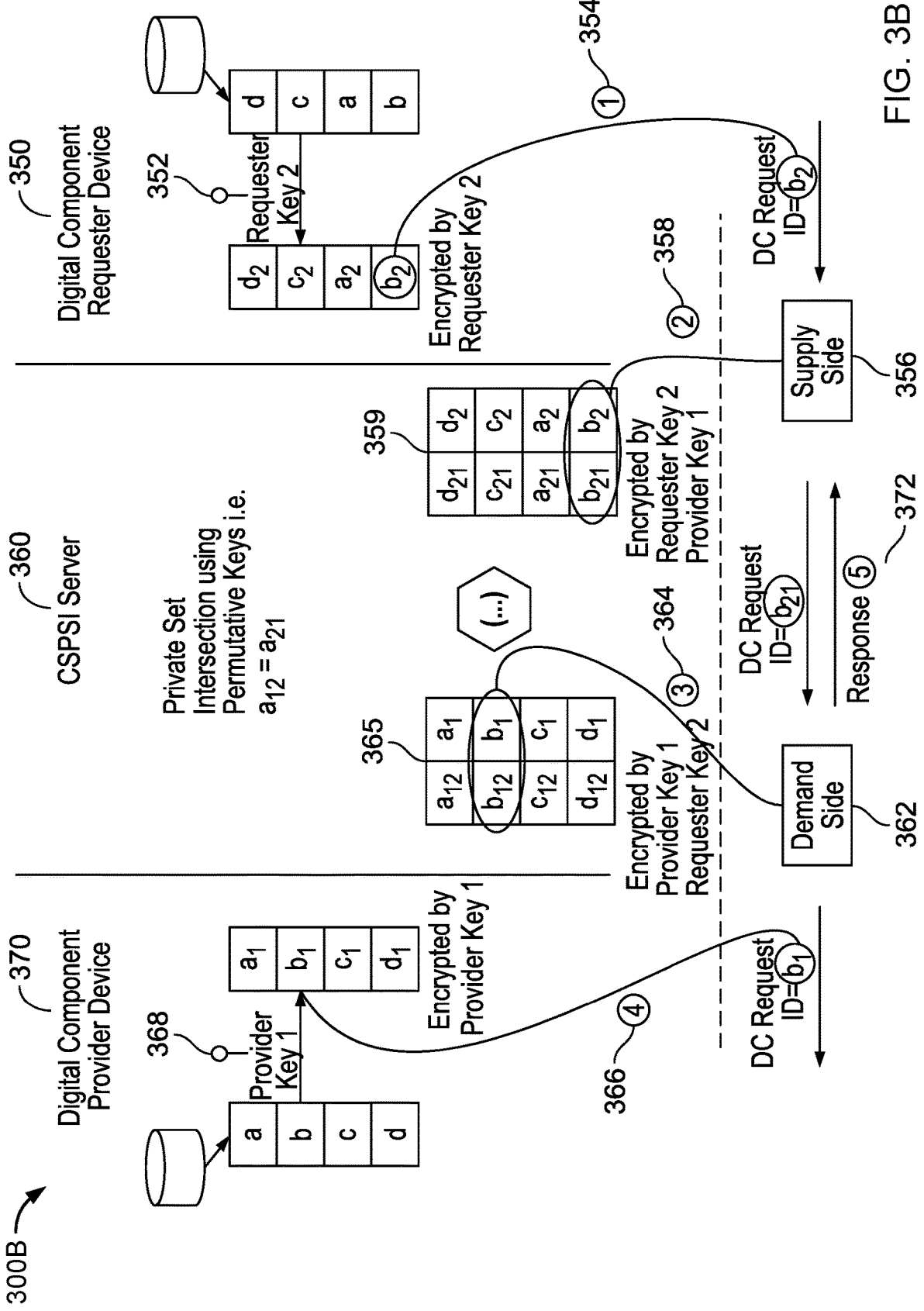
FIG. 3B shows a data flow of an example process for providing customized digital components.

The SSP 150 can then insert the bilateral user ID into the digital component request, e.g., by replacing the encrypted digital component requester's user ID with the bilateral user ID. The SSP 150 can send the updated digital component request to the DSP 140. The DSP 140 can generate and send an identifier retrieval request to the CSPSI server 110 to obtain the encrypted digital component provider's user ID for the particular user. This identifier retrieval request can include the bilateral user ID for the particular user. The CSPSI server 110 can use the bilateral user ID to identify the encrypted digital component provider's user ID for the particular user and provide the encrypted digital component provider's user ID for the particular user to the DSP 140. The DSP 140 can update the digital component request to include the encrypted digital component provider's user ID for the particular user, e.g., by replacing the bilateral user ID for the particular user with the encrypted digital component provider's user ID for the particular user. The DSP 140 can send the updated digital component request to the digital component provider device 120. The digital component provider device 120 can determine the corresponding plaintext user ID by decrypting the encrypted digital component provider's user ID using a decryption key that corresponds to the digital component provider's encryption key. Thus, the digital component provider 120 device can know which of its users matches the digital component requester's user, and further select and/or customize digital components for the particular user. Example processes for customized user services are illustrated in FIGS. 3A and 3B.

The digital component provider device 120 can be an example of a system implemented as computer programs on one or more computers in one or more locations, in which the systems, components, and techniques described in this specification are implemented. The digital component provider device 120 may include personal computers, mobile communication devices, and other devices that can send and receive data over a network 105.

The digital component requester device 130 can be an example of a system implemented as computer programs on one or more computers in one or more locations, in which the systems, components, and techniques described in this specification are implemented. The digital component requester device 130 may include personal computers, mobile communication devices, and other devices that can send and receive data over a network 105.

The data communication network 105, such as a local area network (LAN), a wide area network (WAN), the Internet, a mobile network, or a combination thereof, connects the CSPSI server 110, the digital component provider device 120, the digital component requester device 130, the DSP 140, the SSP 150, and the client device 160.

The CSPSI server 110 may use a single server computer or multiple server computers operating in conjunction with one another, including, for example, a set of remote computers deployed as a cloud computing service. The CSPSI server 110 can include one or more data processing apparatuses and several different functional components. The various functional components of the CSPSI server 110 may be installed on one or more computers as separate functional components or as different modules of a same functional component. For example, the different functional components can be implemented as computer programs installed on one or more computers in one or more locations that are coupled to each through a network. In cloud-based systems for example, these components can be implemented by individual computing nodes of a distributed computing system.

A client device 160 is an electronic device that is capable of communicating over the network 105. Example client devices 160 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, or a gaming device or console.

FIG. 2A is a flow diagram of an example process 200A for encrypting user IDs and determining metric data indicating intersection amounts. For example, the process 200A can be performed by a CSPSI server, e.g., the CSPSI server 110, of FIG. 1. Operations of the process 200A can be performed by any appropriate device or system, e.g., any appropriate data processing apparatus. Operations of the process 200A can also be implemented as instructions stored on a computer readable medium, which may be non-transitory. Execution of the instructions cause one or more data processing apparatus to perform operations of the process 200A.

At step 202, the CSPSI server receives a set of encrypted digital component provider's user IDs from a digital component provider device of a digital component provider. The CSPSI server can also receive a set of encrypted digital component requester's user IDs from a digital component requester device of a digital component requester. The set of encrypted digital component provider's user IDs can include a set of digital component provider's user IDs that are encrypted using the digital component provider's encryption key. The set of encrypted digital component requester's user IDs can include a set of digital component requester's user IDs that are encrypted using the digital component requester's encryption key.

The digital component provider device can maintain a set of digital component provider's user IDs, e.g., the identity information of the digital component provider's first-party users. To protect the privacy of the user data, the digital component provider device can encrypt the set of the digital component provider's user IDs using the digital component provider's encryption key. The digital component provider device can maintain a correspondence relationship between the plaintext user IDs and the cypher text user IDs. The relationship can be maintained using a table or other appropriate data structure. The digital component provider device can communicate with other devices using the cypher text user data. As a result, only the digital component provider device can identify the particular user ID based on its corresponding cypher text. Other devices in the environment can see the cypher text of the user ID, but cannot access the plaintext user ID. Thus, the digital component provider's user privacy is protected.

The digital component requester device can maintain a set of digital component requester's user IDs, e.g., the identity information of the digital component requester's first-party users. To protect the privacy of the user data, the digital component requester device can encrypt the set of the digital component requester's user IDs using the digital component requester's encryption key. The digital component requester device can maintain a correspondence relationship, e.g., in the form of a table or other data structure, between the plaintext user IDs and the cypher text user IDs. The digital component requester device can communicate with other devices using the cypher text user data. As a result, only the digital component requester device can identify the particular user ID based on its corresponding cypher text. Other devices in the environment can see the cypher text of the user ID, but cannot access the plaintext user ID. Thus, the digital component requester's user privacy is protected.

At step 204, the CSPSI server receives the digital component provider's encryption key from the digital component provider device. The CSPSI server also receives the digital component requester's encryption key from the digital component requester device. The digital component provider's encryption key and the digital component requester's encryption key are permutative keys.

In the permutable encryption approach, two permutative keys can convert a plaintext into the same cipher text regardless of the sequence/order in which the two permutative keys are applied to the plaintext.

At step 206, the CSPSI server encrypts the encrypted digital component provider's user IDs with the digital component requester's encryption key to obtain a set of bilateral encrypted digital component provider's user IDs. The CSPSI server can encrypt the encrypted digital component requester's user IDs with the digital component provider's encryption key to obtain a set of bilateral encrypted digital component requester's user IDs.

The CSPSI server can further store a correspondence relationship between the encrypted digital component provider's user IDs and the bilateral encrypted digital component provider's user IDs. For example, the CSPSI server can generate and store a table that maps, for each user for which an encrypted digital component provider's user ID was received, the encrypted digital component provider's user ID for the user to the bilateral encrypted digital component provider's user ID for the user. The CSPSI server can also store a correspondence relationship between the encrypted digital component requester's user IDs and the bilateral encrypted digital component requester's user IDs. For example, the CSPSI server can generate and store a table that maps, for each user for which an encrypted digital component requester's user ID was received, the encrypted digital component requester's user ID for the user to the bilateral encrypted digital component requester's user ID for the user.

The bilateral encrypted user IDs are bilateral IDs that are encrypted twice using both the digital component provider's encryption key and the digital component requester's encryption key. Specifically, the bilateral encrypted digital component provider's user IDs are first encrypted with the digital component provider's encryption key, then encrypted with the digital component requester's encryption key. The bilateral encrypted digital component requester's user IDs are first encrypted with the digital component requester's encryption key, then encrypted with the digital component provider's encryption key.

Because the two permutative keys, e.g., digital component provider's encryption key and the digital component requester's encryption key, can convert a plaintext into the same cipher text regardless of the sequence/order in which the two permutative keys are applied, the CSPSI server can determine whether the digital component provider's plaintext user IDs match the digital component requester's plaintext user IDs based on determining whether bilateral encrypted digital component provider's user IDs match bilateral encrypted digital component requester's user IDs, e.g., the bilateral IDs for the digital component provider and the digital component requester.

At step 208, the CSPSI server determines an intersection between the bilateral encrypted digital component provider's user IDs and the bilateral encrypted digital component requester's user IDs. The intersection between the two sets of bilateral encrypted user IDs corresponds to a set of matching user IDs that are included in the digital component provider's user IDs and the digital component requester's user IDs. The intersection between the two sets of bilateral encrypted user IDs corresponds to the set of matching users that are commonly owned by the digital component provider and the digital component requester.

At step 210, the CSPSI server determines metric data indicating the amount of intersection. For example, the metric data can include a percentage of the set of matching user IDs in the set of digital component provider's user IDs and a percentage of the set of matching user IDs in the set of digital component requester's user IDs.

For instance, assume that the CSPSI server receives 10 encrypted digital component provider's user IDs and 20 encrypted digital component requester's user IDs. Also assume that, after double encryption, there are 5 bilateral encrypted users IDs that match between the two sets of bilateral encrypted user IDs. To determine the quantity of matching bilateral user IDs, the CSPSI server can compare the bilateral encrypted digital component provider's user IDs to the bilateral encrypted digital component requester's user IDs. In this example, the metric data can include a 50% matching percentage for the digital component provider, and a 25% matching percentage for the digital component requester.

At step 212, the CSPSI server transmits the metric data to the digital component provider device and the digital component requester device, e.g., over a data communication network. After receiving the matching ratios in the metric data, the digital component provider device and the digital component requester device can determine whether to proceed with customized user services using bilateral user IDs. The digital component provider device can compare the digital component provider's matching percentage with a threshold of the digital component provider. The digital component provider device can determine to proceed with the customized user services if its matching ratio satisfies its threshold, e.g., by meeting or exceeding its threshold. Similarly, the digital component requester device can compare the digital component requester's matching percentage with a threshold of the digital component requester. The digital component requester device can determine to proceed with the customized user services if its matching ratio satisfies its threshold, e.g., by meeting or exceeding its threshold. In some implementations, the digital component provider's threshold and the digital component requester's threshold can be determined by the digital component provider and the digital component requester, respectively.

At this stage, the digital component provider device and the digital component requester device may know the matching percentage of their user IDs. The digital component provider device and the digital component requester device do not know the exact user IDs of the matching users. Furthermore, the digital component provider device does not have access to the user IDs of the digital component requester and the digital component requester device does not have access to the user IDs of the digital component provider.

The order of steps in the process 200A described above is illustrative only, and can be performed in different orders. In some implementations, the process 200 can include additional steps, fewer steps, or some of the steps can be divided into multiple steps.

FIG. 2B shows a data flow of an example process 200B for encrypting user IDs and determining metric data indicating intersection amounts.

The digital component provider device 250 can maintain a set of user data, e.g., a set of user IDs 252 of its first-party users. In some implementations, the digital component provider device 250 can store the user IDs 252 in a database 253. To protect the privacy of the user data, the digital component provider device 250 can encrypt the set of user IDs 252 using the digital component provider's encryption key $Key_1$ 254 to obtain encrypted digital component provider's user IDs 256. The digital component provider device 250 can maintain a correspondence relationship between the plaintext user IDs 252 and the cypher text user IDs 256.

In some implementations, the digital component provider device 250 can maintain different encryption keys for each digital component requester that the digital component provider interacts with using bilateral user IDs to select and/or customize digital components for users. For example, the encryption key 254 can be for the digital component requester corresponding to the digital component requester device 260. A different encryption key can be used for different digital component requesters. In this way, entities cannot track users across multiple publishers (e.g., across multiple domains) based on the encrypted user IDs 256.

The digital component requester device 260 can maintain a set of user data, e.g., a set of user IDs 262 of its first-party users. In some implementations, the digital component requester device 260 can store the user IDs 262 in a database 263. To protect the privacy of the user data, the digital component requester device 260 can encrypt the set of the digital component requester's user IDs 262 using the digital component requester's encryption key $Key_2$ 264. The digital component requester device can maintain a correspondence relationship between the plaintext user IDs 262 and the cypher text user IDs 266.

In some implementations, the digital component requester device 260 can maintain different encryption keys for each digital component provider that the digital component requester interacts with using bilateral user IDs to receive customized digital components for users. For example, the encryption key 264 can be for the digital component provider corresponding to the digital component provider device 250. A different encryption key can be used for different digital component providers. In this way, entities cannot track users across multiple publishers (e.g., across multiple domains) based on the encrypted user IDs 266.

The CSPSI server 270, which can be the same or similar to the CSPSI server 110 of FIG. 1, can receive the set of encrypted digital component provider's user IDs 256 from the digital component provider device 250. The CSPSI server 270 can also receive the set of encrypted digital component requester's user IDs 266 from the digital component requester device 260.

The CSPSI server 270 can receive the digital component provider's encryption key $Key_1$ 254 from the digital component provider device 250 and the digital component requester's encryption key $Key_2$ 264 from the digital component requester device 260. The digital component provider's encryption key $Key_1$ 254 and the digital component requester's encryption key $Key_2$ 264 are permutative keys.

The CSPSI server 270 can encrypt the encrypted digital component provider's user IDs 256 with the digital component requester's encryption key $Key_2$ 264 to obtain a set of bilateral encrypted digital component provider's user IDs 272. The CSPSI server 270 can encrypt the encrypted digital component requester's user IDs 264 with the digital component provider's encryption key $Key_1$ 254 to obtain a set of bilateral encrypted digital component requester's user IDs 274.

The CSPSI server 270 can further store a correspondence relationship 276 between the encrypted digital component provider's user IDs 256 and the bilateral encrypted digital component provider's user IDs 272. The CSPSI server 270 can also store a correspondence relationship 278 between the encrypted digital component requester's user IDs 266 and the bilateral encrypted digital component requester's user IDs 274. For example, the relationships 276 and 278 can be stored as tables, with each row mapping an encrypted user ID to a corresponding bilateral ID for a given user. Other appropriate data structures can also be used.

The two permutative keys, e.g., digital component provider's encryption key $Key_1$ 254 and the digital component requester's encryption key $Key_2$ 264, can convert a plaintext into the same cipher text regardless of the sequence/order in which the two permutative keys are applied. For example, for a user with user ID a, the bilateral encrypted user ID $a_{12}$ is generated by encrypting a first using $Key_1$ to obtain $a_1$, and further encrypting $a_1$ using $Key_2$. The bilateral encrypted user ID $a_{21}$ is generated by encrypting a first using $Key_2$ to obtain $a_2$, and further encrypting $a_2$ using $Key_1$. For the same user a, the bilateral encrypted user ID $a_{12}$ is equal to the bilateral encrypted user ID $a_{21}$.

The CSPSI server 270 can determine whether the digital component provider's plaintext user IDs 252 match the digital component requester's plaintext user IDs 262 based on determining whether bilateral encrypted digital component provider's user IDs 272 match bilateral encrypted digital component requester's user IDs 274. For example, the CSPSI server 270 can compare each bilateral encrypted digital component provider's user ID 272 to each bilateral encrypted digital component requester's user ID 274.

The CSPSI server 270 can determine an intersection between the bilateral encrypted digital component provider's user IDs 272 and the bilateral encrypted digital component requester's user IDs 274. The intersection between the two sets of bilateral encrypted user IDs 272, 274 corresponds to a set of matching user IDs that are included in the digital component provider's user IDs 252 and the digital component requester's user IDs 262. The bilateral encrypted user IDs of the intersection are those that match between bilateral encrypted digital component provider's user IDs 272 and the bilateral encrypted digital component requester's user IDs 274. That is, the bilateral encrypted user IDs of the intersection are those included in both sets.

After determining the intersection, the CSPSI server 270 can determine metric data indicating the amount of intersection. For example, the metric data can include a percentage of matching user IDs in the set of digital component provider's user IDs 252 and a percentage of the matching user IDs in the set of digital component requester's user IDs 262, as described above.

The CSPSI server 270 can also store the relationships 276 and 278 and use these relationships to provide the appropriate encrypted IDs and/or bilateral encrypted IDs in response to identifier retrieval requests. For example, a device corresponding to the digital component requester (e.g., the digital component requester device 260 or a SSP) can send identifier retrieval requests to the CSPSI server 270 when requesting a digital component from the digital component provider. Similarly, a device corresponding to the digital component provider (e.g., the digital component requester device 250 or a DSP) can send identifier retrieval requests to the CSPSI server 270 when preparing to response to a digital component request received from the digital component requester.

FIG. 3A is a flow diagram of an example process 300A for providing customized digital components. For example, the process 300A can be performed by a CSPSI server, e.g., the CSPSI server 110, of FIG. 1. Operations of the process 300A can be performed by any appropriate device or system, e.g., any appropriate data processing apparatus. Operations of the process 300A can also be implemented as instructions stored on a computer readable medium, which may be non-transitory. Execution of the instructions cause one or more data processing apparatus to perform operations of the process 300A.

At step 302, the CSPSI server receives, from the digital component requester device, an identifier retrieval request. The identifier retrieval request can correspond to a digital component request being sent from a first device corresponding to a first entity to a second device corresponding to a second entity. The first entity can be a digital component requester, e.g., a publisher of an electronic resource, and the second entity can be a digital component provider. In this example, the first device can be the digital component requester device or an SSP corresponding to the digital component requester. Similarly, the second device can be the digital component provider device or a DSP corresponding to the digital component provider. The identifier retrieval request from the first device can include an encrypted user ID generated by encrypting a user ID, for a user of the digital component requester, using an encryption key corresponding to the digital component requester.

In customized user services, the digital component requester device can initiate a digital component request for digital components for a user. For example, the digital component requester device can generate a digital component request to request a digital component for display with an electronic resource that the user is accessing. The user can be one of the first-party users of the digital component requester. The digital component requester device can send the digital component request to the digital component provider device. In some implementations, the digital component request is sent from the SSP corresponding to the digital component requester device to the DSP corresponding to the digital component provider device.

The first device can send the identifier retrieval request to the CSPSI server to request a bilateral encrypted user ID for the user. To enable the CSPSI server to identify the appropriate bilateral encrypted user ID for the user, the identifier retrieval request can include the encrypted user ID for the user generated using the digital component requester's encryption key, e.g., the encrypted user ID of the digital component request. In some implementation, e.g., when the first device is a SSP, the digital component requester device can send the encrypted user ID of the targeted user to the SSP. The SSP can transmit the encrypted user ID of the user to the CSPSI server.

At step 304, the CSPSI server determines a bilateral encrypted user ID for the user. As described above, the bilateral encrypted ID for the user can be generated by encrypting the encrypted user identifier of the user of the digital component requester using an encryption key corresponding to the digital component provider.

As discussed above, the CSPSI server stores a correspondence relationship between the encrypted digital component requester's user IDs and bilateral encrypted digital component requester's user IDs. The CSPSI server can determine the bilateral encrypted user ID of the user that corresponds to the encrypted user ID. The bilateral encrypted user ID of each user of the digital component requester is generated by encrypting the encrypted user ID using the digital component provider's encryption key.

At step 306, the CSPSI server sends the bilateral encrypted user identifier for the user to the first device. In some implementations, the CSPSI server can send the bilateral encrypted user ID of the user to the SSP of the digital component requester device.

At this point, the first device has a bilateral encrypted user ID of the user that can be used by either the digital component requester or the digital component provider. This bilateral user ID represents the user to only these two parties and enables the first device to update the digital component request to include a user identifier that can be used by the second device to identify the user, e.g., via interaction with the CSPSI server.

At step 308, the CSPSI server receives, from the second device, the bilateral encrypted user ID of the user.

After receiving the bilateral encrypted user ID for the user from the CSPSI server, the first device can send the bilateral encrypted user ID to the second device. For example, the first device can replace the encrypted user ID for the user in the digital component request with the bilateral encrypted user identifier for the user. The first device can provide the updated digital component request to the second device.

The second device can send an identifier retrieval request to the CSPSI server to request the digital component provider's encrypted user ID for the user. The second device can send this identifier retrieval request in response to receiving the updated digital component request from the first device. The second device can request the digital component provider's encrypted user ID for the user so that the digital component provider device can decrypt the digital component provider's encrypted user ID for the user and identify the user for which a digital component is being requested.

In this identifier retrieval request, the second device (e.g., the digital component provider device or its DSP) can provide the bilateral encrypted user ID of the user to the CSPSI server. The CSPSI server can obtain the bilateral encrypted user ID for the user from the identifier retrieval request.

At step 310, the CSPSI server determines, using the bilateral encrypted user ID for the user, an encrypted user ID for the user that was previously generated by encrypting the user ID for the user using the digital component provider's encryption key.

After receiving the bilateral encrypted user ID of the user, the CSPSI server can search the set of bilateral encrypted user IDs of the digital component provider to determine whether there is a match. As discussed above, the CSPSI server stores a correspondence relationship between the encrypted digital component provider's user IDs and the bilateral encrypted digital component provider's user IDs. If a matching bilateral encrypted digital component provider's user ID is found, the CSPSI server can determine the corresponding encrypted digital component provider's user ID, which is the encrypted user ID for the user generated by encrypting the user ID for the user using the digital component provider's encryption key.

At step 312, the CSPSI server sends the encrypted user ID for the user that is generated by encrypting the user ID for the user using the digital component provider's encryption key, to the second device.

In some implementations, the CSPSI server can transmit the corresponding encrypted digital component provider's user ID for the user to the DSP of the digital component provider device. The DSP can transmit the encrypted digital component provider's user ID for the user to the digital component provider device, e.g., as part of an updated digital component request.

Because the digital component provider device generated the encrypted digital component provider's user ID using the digital component provider's encryption key, the digital component provider device can determine the corresponding plaintext user ID after decrypting the encrypted digital component provider's user ID using a decryption key of the digital component provider. Thus, the digital component provider device can identify which of its users is the user for which the digital component request has been sent.

The digital component provider device can select a digital component for display to the user based on user data for the user maintained by the digital component provider device. For example, the digital component provider device can use the plaintext user ID obtained by decrypting the encrypted user ID obtained from the CSPSI server to identify a set of user data corresponding to the user that is maintained by the digital component provider.

The digital component provider device can provide the selected digital component and/or data related to the digital component to the first device, e.g., the SSP or digital component requester device. The data can include a resource locator (e.g., a Universal Resource Locator (URL) or Universal Resource Identifier (URI)) from which the digital component can be downloaded and selection criteria for the digital component. The selection criteria can represent an amount that the digital component provider is willing to provide to the digital component requester, e.g., a publisher, for displaying the digital component to the user. For example, the digital component requester can send a digital component request for a particular digital component slot of the electronic resource being accessed by the user to multiple digital component providers. In this example, the SSP or digital component provider device can receive multiple digital components and corresponding selection criteria. The SSP or digital component provider device can select, from the multiple digital components, a particular digital component to display to the user based on the received data.

In some implementations, the digital component selected by the second device can include content related to the particular user's historical behavior or interests, e.g., as determined based on the user data maintained by the digital component provider. For example, the digital components can be related to the particular user's previously purchased products, or services, or both, included in the first-party user data of the digital component provider.

The order of steps in the process 300A described above is illustrative only, and can be performed in different orders. In some implementations, the process 300A can include additional steps, fewer steps, or some of the steps can be divided into multiple steps.

FIG. 3B shows an example data flow of a process 300B for providing customized digital components.

In customized user services, the digital component requester device 350 can initiate a digital component request for digital components for a user with user ID b. The user, e.g., user b, can be one of the first-party users of the digital component requester. User b's encrypted user ID can be $b_2$, which is generated by encrypting the plaintext user ID b using an encryption key $Key_2$ 352 of the digital component requester.

In a first stage 354, the digital component requester device can send the encrypted user ID $b_2$ to the SSP 356 for the digital component requester. In a second stage 358, the SSP 356 can send an identifier retrieval request to the CSPSI server 360, which can be the same as or similar to the CSPSI server 110 of FIG. 1. The identifier retrieval request can include the encrypted user ID $b_2$.

After receiving the encrypted user ID $b_2$, the CSPSI server 360 can determine the bilateral encrypted user ID $b_{21}$ corresponding to the encrypted user ID $b_2$ for user b, based on a correspondence relationship 359 for digital component requester's user IDs. As discussed above, the CSPSI server 360 stores the correspondence relationship 359 between the encrypted digital component requester's user IDs and the bilateral encrypted digital component requester's user IDs. The bilateral encrypted user ID $b_{21}$ is generated by encrypting $b_1$ using an encryption key $Key_1$ 368 of the digital component provider. The CSPSI server 360 can send the bilateral encrypted user ID $b_{21}$ for the user b to the SSP 356 of digital component requester device.

The SSP 356 can send the bilateral encrypted user ID $b_{21}$ to the DSP 362 of the digital component provider device in the digital component request, e.g., as part of an updated digital component request. In a third stage 364, the DSP 362 can provide the bilateral encrypted user ID $b_{21}$ to the CSPSI server 360, in response to receiving the bilateral encrypted user ID $b_{21}$ from the DSP 362. That is, the DSP 362 can send an identifier retrieval request to the CSPSI server 360 to request the digital component provider's encrypted user ID for the user b.

The CSPSI server 360 can receive the bilateral encrypted user ID $b_{21}$ of the user b. The CSPSI server 360 can search the set of bilateral encrypted user IDs of the digital component provider to determine whether there is a match. In this example, the CSPSI server 360 can find a bilateral encrypted user ID $b_{12}$ that matches the received bilateral encrypted user ID $b_{21}$.

As discussed above, the CSPSI server 360 stores a correspondence relationship 365 between the encrypted digital component provider's user IDs and the bilateral encrypted digital component provider's user IDs. Based on the correspondence relationship 365, the CSPSI server 360 can determine the encrypted digital component provider's user ID $b_1$ that corresponds to $b_{21}$. The encrypted digital component provider's user ID $b_1$ is the encrypted user ID for user b generated by encrypting the user ID b using the digital component provider's encryption key 368. The CSPSI server 360 can send the encrypted user ID $b_1$ to the DSP 362.

In a fourth stage 366, the DSP 362 can send the encrypted user ID $b_1$ to the digital component provider device 370. Because the digital component provider device 370 generated the encrypted user ID $b_1$ using its encryption key $Key_1$ 368, the digital component provider device 370 can determine the corresponding plaintext user ID b after decrypting the encrypted user ID $b_1$ using a decryption key of the digital component provider 370. Thus, the digital component provider device 370 can know that its user b is the user for which the digital component request has been sent.

In a fifth stage 372, the DSP 362 sends a response to the digital component request to the SSP 356. For example, the digital component provider device 370 can select a digital component based on user data for the user b maintained by the digital component provider device 370. The digital component provider device 370 can send a response that includes data for the selected digital component, e.g., the digital component itself, a resource locator for the digital component, selection criteria for the digital component, and/or other appropriate information related to the digital component. If the digital component requester device 350 sent the digital component request to multiple digital component providers, the SSP 356 can select a digital component from among responses received from the multiple digital component providers and provide the data for the selected digital component to the digital component requester device 350. In turn, the digital component requester device 350 can provide the digital component for display to the user b. For example, the digital component requester device 350) can embed the digital component in the electronic resource being accessed by the user b.

In some implementations, the provision and publishing of the digital components can be implemented using the intermediary platforms, such as DSP and the SSP. Because the DSP and SSP only receive the user ID that is in cypher text forms, the user's privacy is protected from the intermediary entities, e.g., DSP and SSP.

The bilateral encrypted user IDs are useful only in the context of the specific digital component provider and the specific digital component requester, and are meaningless outside the particular relationship between the specific digital component provider and the specific digital component requester. For example, assuming the cryptographically secure and privacy-preserving matching is performed between digital component provider A and digital component requester P, the bilateral encrypted user IDs are obtained using digital component provider A's encryption key and digital component requester P's encryption key. If another digital component requester Q participates in the cryptographically secure and privacy-preserving matching with digital component provider A, the bilateral encrypted user IDs will be obtained using digital component provider A's encryption key and digital component requester Q's encryption key. Because P's encryption key and Q's encryption key are different, the bilateral encrypted user ID of a user in relationship A-P is different from the bilateral encrypted user ID of the same user in relationship A-Q. Therefore, for the same user ID, its bilateral encrypted user ID will be different in different digital component provider-digital component requester relationships. As a result, even if the same digital component provider A is in different relationships with different digital component requesters, and the different relationships share the same user, the received bilateral encrypted user IDs, by the DSP, for the same user are different in different relationships. Thus, the DSP on the digital component provider side cannot know the bilateral encrypted user IDs are for the same user and cannot perform cross domain profile tracking.

Similarly, even if the same digital component requester P is in different relationships with different digital component requesters, and the different relationships share the same user, the received bilateral encrypted user IDs, by the SSP, for the same user are different in different relationships.

Thus, the SSP on the digital component requester side cannot know the bilateral encrypted user IDs are for the same user and cannot perform cross domain profile tracking.

Figure 4:
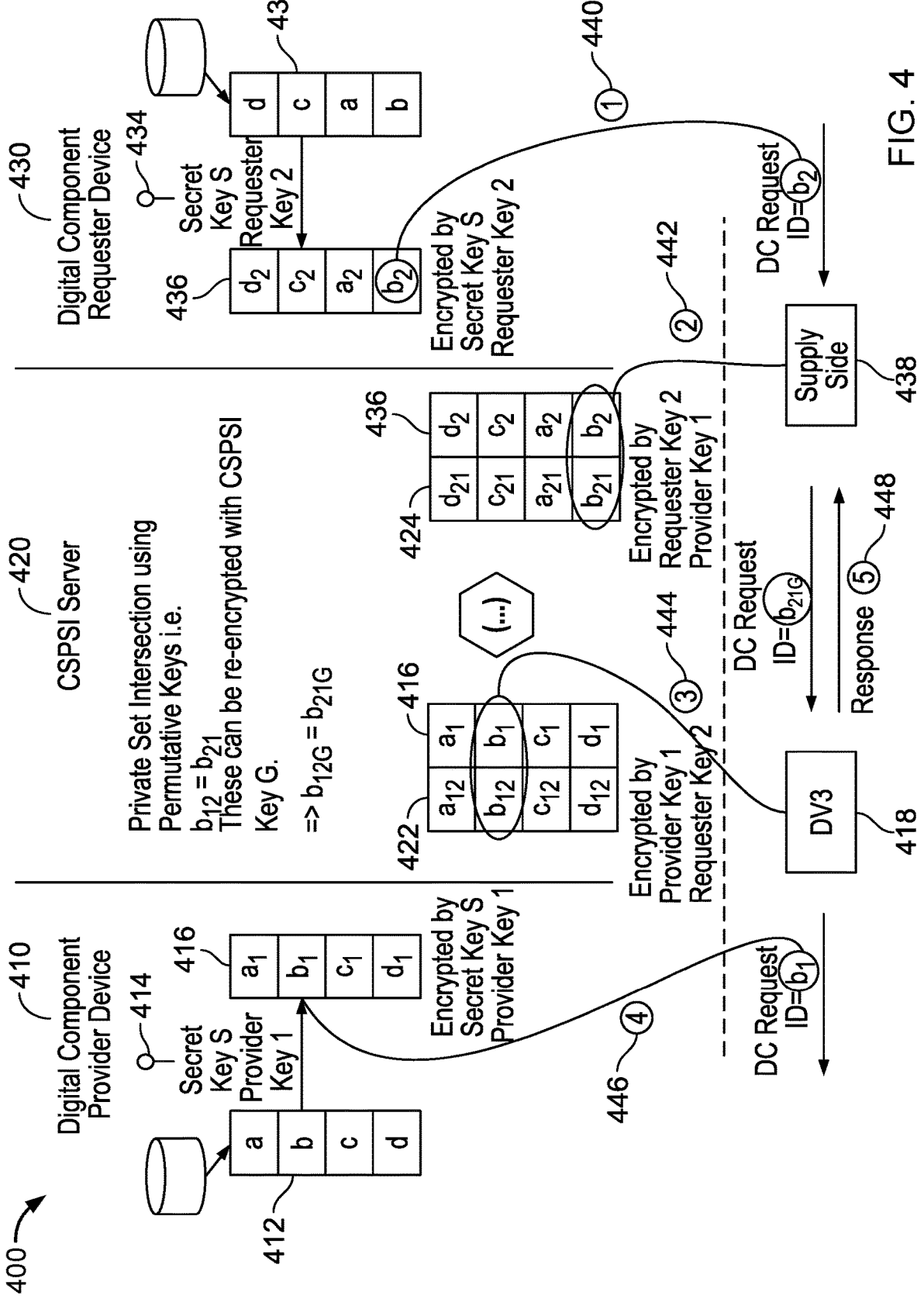
FIG. 4 shows an example data flow of a security-enhanced process for providing customized digital components.

FIG. 4 shows a data flow of an example security-enhanced process 400 for providing customized digital components.

To improve the security of each entity involved in the process of providing customized digital components, more keys are introduced. For example, the digital component provider device 410 and the digital component requester device 430 and can share an encryption key S. The CSPSI server 420 can have a secret key G. In addition, the digital component provider device can have an encryption key $Key_1$. The digital component requester device can have an encryption key $Key_2$. The two encryption keys $Key_1$ and $Key_2$ are permutative keys.

The digital component provider device 410 can encrypt its user IDs 412 using the shared secret key S and the digital component provider's encryption key $Key_1$ 414 to obtain encrypted digital component provider's user IDs 416. For example, the digital component provider device 410 can encrypt each user ID 412 with the shared encryption key S to obtain an initial cypher text of the user ID, and encrypt the initial cypher text of the user ID using the digital component provider's encryption key $Key_1$ to obtain the encrypted digital component provider's user ID 416. For example, for a user with user ID b, the encrypted user ID on the digital component provider's side is $b_1$ The digital component requester device 430 can encrypt its user IDs 432 using the shared secret key S and the digital component requester's encryption key $Key_2$ 434 to obtain encrypted digital component requester's user IDs 436. For example, the digital component requester device 430 can encrypt each user ID 412 with the shared encryption key S to obtain an initial cypher text of the user ID, and encrypt the initial cypher text of the user IDs using the digital component requester's encryption key $Key_2$ to obtain the encrypted digital component requester's user ID 436. For example, for the user with user ID b, the encrypted user ID on the digital component requester's side is $b_2$.

As discussed above, the CSPSI server 420, which can be the same as or similar to the CSPSI server 110 of FIG. 1, can receive the encrypted digital component provider's user IDs 416 and the encrypted digital component requester's user IDs 436. The CSPSI server 420 can encrypt the encrypted digital component provider's user IDs 416 with the digital component requester's encryption key $Key_2$ to obtain bilateral encrypted digital component provider's user IDs 422. For example, for the encrypted user ID $b_1$ on the digital component provider's side, the bilateral encrypted user ID is $b_{12}$.

The CSPSI server 420 can encrypt the encrypted digital component requester's user IDs 436 with the digital component provider's encryption key $Key_1$ to obtain bilateral encrypted digital component requester's user IDs 424. For example, for the encrypted user ID $b_2$ on the digital component requester's side, the bilateral encrypted user ID is $b_{21}$. The bilateral encrypted user ID $b_{12}$ is equal to $b_{21}$.

The CSPSI server 420 can further encrypt the bilateral encrypted user identifiers 422, 424 with the server's encryption key G to obtain server-encrypted bilateral encrypted user IDs. For example, for the bilateral encrypted user ID $b_{12}$ on the digital component provider's side, the server-encrypted bilateral encrypted user ID is $b_{12G}$, which is generated by encrypting $b_{12}$ using the server's encryption key G. For example, for the bilateral encrypted user ID $b_{21}$ on the digital component requester's side, the server-encrypted bilateral encrypted user ID is $b_{21G}$, which is generated by encrypting $b_{21}$ using the server's encryption key G. The server-encrypted bilateral encrypted user ID $b_{12G}$ is equal to $b_{21G}$.

The techniques described in this document encrypt the confidential information multiple times using different entities' keys to ensure that, even if a computer of one entity is compromised, the amount of confidential information that can be accessed is minimized or at least reduced relative to other techniques.

In customized user services, the digital component requester device 430 can initiate a digital component request for digital components for a user with user ID b. In a first stage 440, the digital component requester device 430 can send the encrypted user ID $b_2$ to the SSP 438, e.g., in the digital component request. The encrypted user ID $b_2$ is generated by encrypting plaintext user ID b using the shared encryption key S to obtain cypher text of user ID b, and encrypting the cypher text of user ID b using the digital component requester's encryption key $Key_2$.

In a second stage 442, the SSP 438 can send an identifier retrieval request to the CSPSI server 420. The identifier retrieval request can include the encrypted user ID $b_2$. After receiving the encrypted user ID $b_2$, the CSPSI server 420 can determine the server-encrypted bilateral encrypted user ID $b_{21G}$ corresponding to the received $b_2$ for user b. The CSPSI server 420 can send the server-encrypted bilateral encrypted user ID $b_{21G}$ for the user b to the SSP 438 of digital component requester device 430. The SSP 438 can send the server-encrypted bilateral encrypted user ID $b_{21G}$ to the DSP 418 of the digital component provider device 410, e.g., as part of an updated digital component request.

In a third stage 444, the DSP 418 can send an identifier retrieval request that includes the server-encrypted bilateral encrypted user ID $b_{21G}$ to the CSPSI server 420, in response to receiving the server-encrypted bilateral encrypted user ID $b_{21G}$. The CSPSI server 420 can receive the server-encrypted bilateral encrypted user ID $b_{21G}$ of the user b. The CSPSI server 420 can search the set of server-encrypted bilateral encrypted user IDs of the digital component provider to determine whether there is a match. In this example, the CSPSI server 420 can find a server-encrypted bilateral encrypted user ID $b_{12G}$ that matches the received bilateral encrypted user ID $b_{21G}$. The CSPSI server 420 can determine the encrypted digital component provider's user ID $b_1$ that corresponds to $b_{12G}$. The CSPSI server 420 can send the encrypted user ID $b_1$ to the DSP 418.

In a fourth stage 446, the DSP 418 can send the encrypted user ID $b_1$ to the digital component provider device 410. Because the digital component provider device 410 generated the encrypted user ID $b_1$ using the shared encryption key S and its encryption key $Key_1$, the digital component provider device 410 can determine the corresponding plaintext user ID b after decrypting the encrypted user ID $b_1$ using a decryption key corresponding to $Key_1$ and another encryption key corresponding to S. Thus, the digital component provider device 410 can determine that its user b is the user for which the digital component request has been sent. The digital component provider device 410 can select a digital component based on user data corresponding to the user b. The digital component provider device 410 can then generate and send a response to the digital component request to the DSP 418. The response can include data for the selected digital component, e.g., the digital component itself, a resource locator for the digital component, selection criteria for the digital component, and/or other appropriate information related to the digital component.

In a fifth stage 448, the DSP 418 can send the response to the SSP 438. If the digital component requester device 430 sent the digital component request to multiple digital component providers, the SSP 438 can select a digital component from among responses received from the multiple digital component providers and provide the data for the selected digital component to the digital component requester device 430. In turn, the digital component requester device 430 can provide the digital component for display to the user b. For example, the digital component requester device 430 can embed the digital component in the electronic resource being accessed by the user b.

Figure 5:
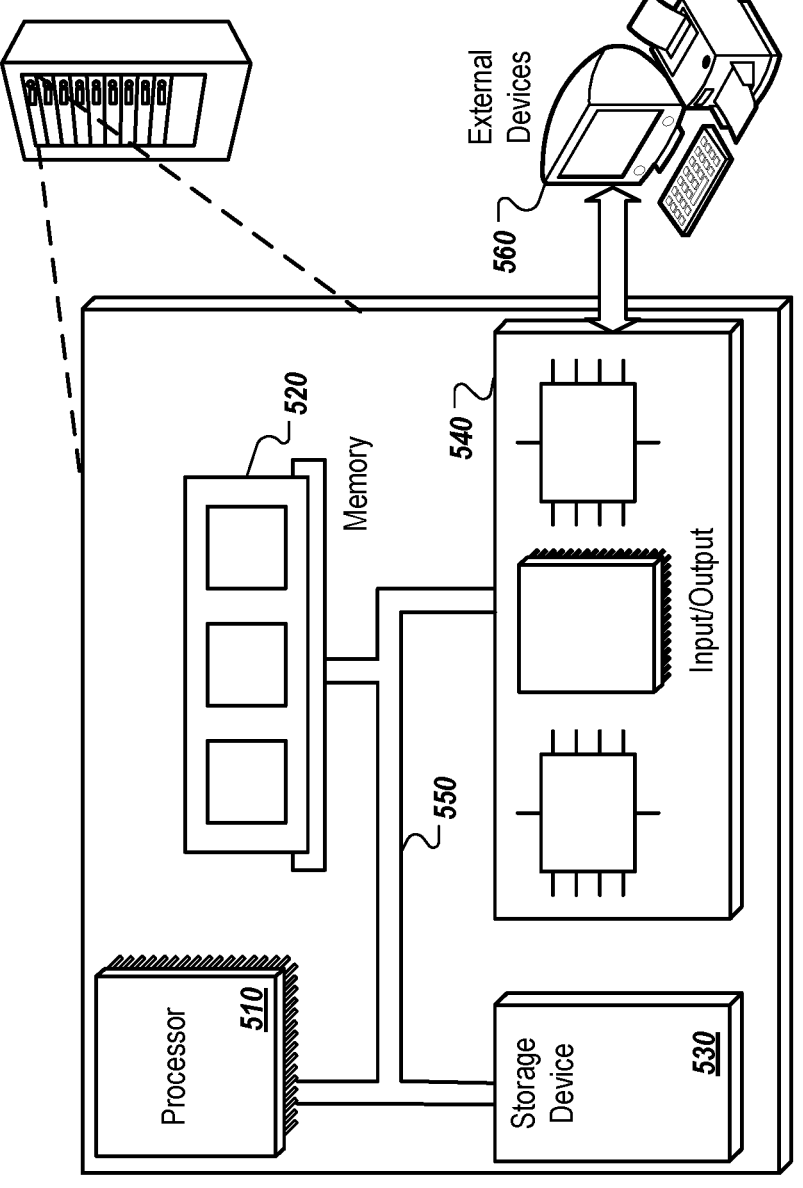
FIG. 5 is a block diagram of an example computer system.
Figure 5:
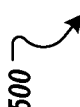

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 560, e.g., keyboard, printer and display devices. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
receiving, by a cryptographically-secure private set intersection server and from a first device corresponding to a first entity, a first identifier retrieval request (i) corresponding to a digital component request being sent from the first device to a second device corresponding to a second entity and (ii) comprising a first encrypted user identifier generated by encrypting a user identifier for a user using a first encryption key corresponding to the first entity;
determining, by the cryptographically-secure private set intersection server using the first encrypted user identifier, a bilateral encrypted user identifier for the user generated by encrypting the first encrypted user identifier using a second encryption key corresponding to the second entity;
sending, by the cryptographically-secure private set intersection server, the bilateral encrypted user identifier for the user to the first device corresponding to the first entity;
receiving, by the cryptographically-secure private set intersection server and from the second device corresponding to the second entity, the bilateral encrypted user identifier;

determining, by the cryptographically-secure private set intersection server using the bilateral encrypted user identifier, a second encrypted user identifier for the user generated by encrypting the user identifier for the user using a second encryption key corresponding to the second entity; and
sending, by the cryptographically-secure private set intersection server, the second encrypted user identifier to the second device corresponding to the second entity.

2. The method of claim 1, wherein:
the second device provides the bilateral encrypted user identifier to the cryptographically-secure private set intersection server in response to receiving the digital component request comprising the bilateral encrypted user identifier from the first device; and
the second device provides, to the first device, selection criteria for a digital component selected based on the user identifier for the user after decrypting the second encrypted user identifier using a decryption key corresponding to the second entity.

3. The method of claim 2, wherein:
the first device selects a particular digital component for display to the user based on respective selection criteria received from multiple entities; and
provides the selected digital component for display to the user.

4. The method of claim 1, wherein:
the first encrypted user identifier is obtained by i) encrypting the user identifier for the user using a shared encryption key that is shared between the first entity and the second entity to obtain an initial cypher text of the user identifier, and ii) encrypting the initial cypher text of the user identifier using the first encryption key corresponding to the first entity, and
the second encrypted user identifier is obtained by i) encrypting the user identifier for the user using the shared encryption key that is shared between the first entity and the second entity to obtain the initial cypher text of the user identifier, and ii) encrypting the initial cypher text of the user identifier using the second encryption key corresponding to the second entity.

5. The method of claim 1, wherein the bilateral encrypted user identifier for the user is encrypted using a third encryption key corresponding to the cryptographically-secure private set intersection server.

6. The method of claim 1, wherein the first encryption key and the second encryption key are permutative keys.

7. The method of claim 1, further comprising:
receiving, by the cryptographically-secure private set intersection server, i) a first set of encrypted user identifiers from the first device corresponding to the first entity, the first set of encrypted user identifiers comprising a first set of user identifiers encrypted using the first encryption key corresponding to the first entity, and ii) a second set of encrypted user identifiers from the second device corresponding to the second entity, the second set of encrypted user identifiers comprising a second set of user identifiers encrypted using the second encryption key corresponding to the second entity;
receiving, by the cryptographically-secure private set intersection server, the first encryption key from the first device and the second encryption key from the second device;
encrypting, by the cryptographically-secure private set intersection server, i) the first set of encrypted user identifiers using the second encryption key to obtain a first set of bilateral encrypted user identifiers, ii) the second set of encrypted user identifiers using the first encryption key to obtain a second set of bilateral encrypted user identifiers;

determining, by the cryptographically-secure private set intersection server, an intersection between the first set of bilateral encrypted user identifiers and the second set of bilateral encrypted user identifiers;

determining, by the cryptographically-secure private set intersection server, metric data indicating an amount of the intersection; and transmitting, by the cryptographically-secure private set intersection server, the metric data to the first device and the second device.

8. The method of claim 7, wherein the intersection corresponds to a set of matching user identifiers that are included the first set of user identifiers corresponding to the first entity and the second set of user identifiers corresponding to the second entity.

9. The method of claim 8, wherein the metric data comprises i) a first percentage of the set of matching user identifiers in the first set of user identifiers corresponding to the first entity, and ii) a second percentage of the set of matching user identifiers in the second set of user identifiers associated with the second entity.

10. The method of claim 7, further comprising:

storing a first correspondence relationship between the first set of encrypted user identifiers and the first set of bilateral encrypted user identifiers; and storing a second correspondence relationship between the second set of encrypted user identifiers and the second set of bilateral encrypted user identifiers.

11. The method of claim 7, wherein:

the first set of encrypted user identifiers are obtained by i) encrypting the first set of user identifiers with a shared encryption key that is shared between the first entity and the second entity to obtain an initial cypher text of the first set of user identifiers, and ii) encrypting the initial cypher text of the first set of user identifiers using the first encryption key corresponding to the first entity, and the second set of encrypted user identifiers are obtained by i) encrypting the second set of user identifiers with the shared encryption key that is shared between the first entity and the second entity to obtain an initial cypher text of the second set of user identifiers, and ii) encrypting the initial cypher text of the second set of user identifiers using the second encryption key corresponding to the second entity.

12. The method of claim 7, further comprising:

encrypting, by the cryptographically-secure private set intersection server, the first set of bilateral encrypted user identifiers and the second set of bilateral encrypted user identifiers with a third encryption key corresponding to the cryptographically-secure private set intersection server.

13. A system comprising:

one or more processors; and one or more storage devices storing instructions that, when executed by the one or more processors, cause the one or more processors to perform operations comprising:

receiving, by a cryptographically-secure private set intersection server and from a first device corresponding to a first entity, a first identifier retrieval request (i) corresponding to a digital component request being sent from the first device to a second device corresponding to a second entity and (ii) comprising a first encrypted user identifier generated by encrypting a user identifier for a user using a first encryption key corresponding to the first entity;

determining, by the cryptographically-secure private set intersection server using the first encrypted user identifier, a bilateral encrypted user identifier for the user generated by encrypting the first encrypted user identifier using a second encryption key corresponding to the second entity;

sending, by the cryptographically-secure private set intersection server, the bilateral encrypted user identifier for the user to the first device corresponding to the first entity;

receiving, by the cryptographically-secure private set intersection server and from the second device corresponding to the second entity, the bilateral encrypted user identifier;

determining, by the cryptographically-secure private set intersection server using the bilateral encrypted user identifier, a second encrypted user identifier for the user generated by encrypting the user identifier for the user using a second encryption key corresponding to the second entity; and sending, by the cryptographically-secure private set intersection server, the second encrypted user identifier to the second device corresponding to the second entity.

14. The system of claim 13, wherein:

the second device provides the bilateral encrypted user identifier to the cryptographically-secure private set intersection server in response to receiving the digital component request comprising the bilateral encrypted user identifier from the first device; and the second device provides, to the first device, selection criteria for a digital component selected based on the user identifier for the user after decrypting the second encrypted user identifier using a decryption key corresponding to the second entity.

15. The system of claim 14, wherein:

the first device selects a particular digital component for display to the user based on respective selection criteria received from multiple entities; and provides the selected digital component for display to the user.

16. The system of claim 13, wherein:

the first encrypted user identifier is obtained by i) encrypting the user identifier for the user using a shared encryption key that is shared between the first entity and the second entity to obtain an initial cypher text of the user identifier, and ii) encrypting the initial cypher text of the user identifier using the first encryption key corresponding to the first entity, and the second encrypted user identifier is obtained by i) encrypting the user identifier for the user using the shared encryption key that is shared between the first entity and the second entity to obtain the initial cypher text of the user identifier, and ii) encrypting the initial cypher text of the user identifier using the second encryption key corresponding to the second entity.

17. The system of claim 13, wherein the bilateral encrypted user identifier for the user is encrypted using a third encryption key corresponding to the cryptographically-secure private set intersection server.

18. A non-transitory computer readable medium carrying instructions that, when executed by one or more processors, cause the one or more processors to perform operations comprising:

receiving, by a cryptographically-secure private set inter-
section server and from a first device corresponding to
a first entity, a first identifier retrieval request (i)
corresponding to a digital component request being
sent from the first device to a second device corresponding to a second entity and (ii) comprising a first
encrypted user identifier generated by encrypting a user
identifier for a user using a first encryption key corre-
sponding to the first entity;

determining, by the cryptographically-secure private set
intersection server using the first encrypted user iden-
tifier, a bilateral encrypted user identifier for the user
generated by encrypting the first encrypted user iden-
tifier using a second encryption key corresponding to
the second entity; sending, by the cryptographically-secure private set inter-
section server, the bilateral encrypted user identifier for
the user to the first device corresponding to the first
entity;

receiving, by the cryptographically-secure private set
intersection server and from the second device corre-
sponding to the second entity, the bilateral encrypted
user identifier;

determining, by the cryptographically-secure private set
intersection server using the bilateral encrypted user
identifier, a second encrypted user identifier for the user
generated by encrypting the user identifier for the user
using a second encryption key corresponding to the
second entity; and sending, by the cryptographically-secure private set intersection server, the second encrypted user identifier to
the second device corresponding to the second entity.

*　*　*　*　*